Oct. 23, 1956   L. J. MILLER   2,767,885
STRAP SUPPORTED LUBRICATOR
Filed Nov. 2, 1953
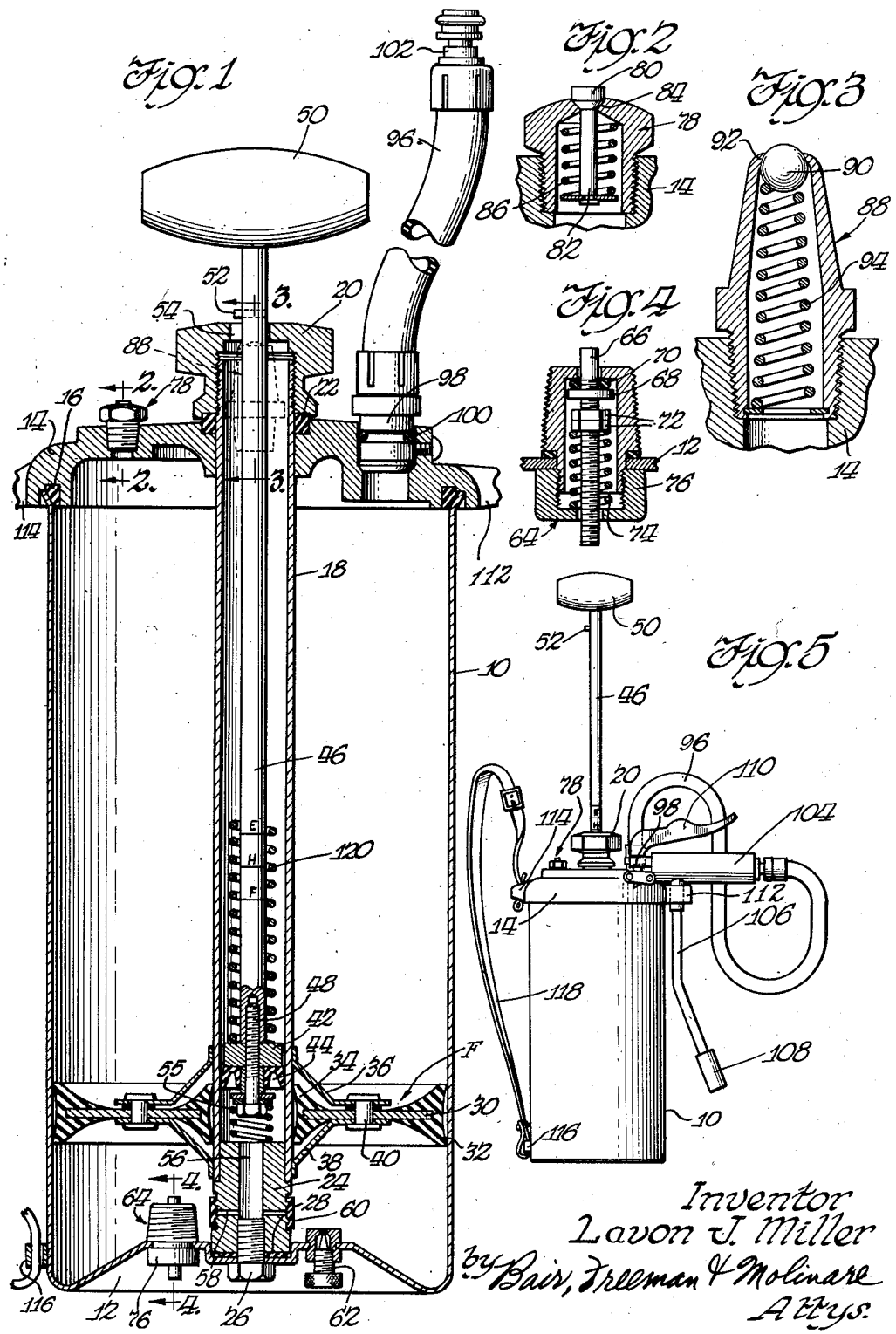
Inventor
Lavon J. Miller
by Bair, Freeman & Molinare
Attys.

United States Patent Office 2,767,885
Patented Oct. 23, 1956

2,767,885

STRAP SUPPORTED LUBRICATOR

Lavon J. Miller, Bryan, Ohio, assignor to Aro Equipment Corporation, Bryan, Ohio, a corporation of Ohio Application November 2, 1953, Serial No. 389,757

9 Claims. (Cl. 222—175)

This invention relates particularly to a strap supported lubricator, although the novel details of the lubricator are applicable to types other than a "strap supported" type.

One object of the invention is to provide a lubricant container adapted to receive a supply of lubricant and including a means to pressurize the lubricant so that it flows properly through a discharge hose to a discharge nozzle and control valve assembly.

Another object is to provide an air pump as the pressurizing means in contrast to the usual arrangement having a spring-urged follower so that with particularly viscous lubricant, and/or in cold weather when the viscosity is high, compensation for high viscosity can be had by pumping in additional air pressure, whereas a spring-urged follower would not have sufficient power in the spring to cause proper flow of the lubricant through the hose to the nozzle, or if a heavy spring is used that is suitable for these conditions, then when the viscosity is low it would over-feed the nozzle.

Still another object is to provide a relatively compact lubricator of the type referred to wherein the pressurizing air pump is enclosed within the lubricant container and the cylinder of the air pump serves as a guide for the lubricant follower.

A further object is to provide a loader nozzle at the top of the lubricant container to load the container with lubricant, and an air vent at the bottom to release air so that, as lubricant is supplied on one side of the follower, the air is displaced from the lubricant container through the air vent on the other side.

Still a further object is to provide a pressure-operated indicator fitting to indicate when the air pressure has been built up to a satisfactory degree for properly forcing the lubricant through the hose to the discharge nozzle.

An additional object is to provide a pressure limiting valve for the air space in the lubricant container so as to prevent the pumping of excessive air pressure thereinto during the operation of the lubricator.

Another additional object is to provide means for determining at any time the amount of lubricant in the lubricator by suspending the lubricator from the air pump handle, a spring being provided surrounding the piston rod of the air pump for this purpose so as to be compressed by the weight of the lubricator and its contents and the piston rod having indicia thereon to indicate the condition of the lubricator at that time—that is, whether it is partially full or empty.

With these and other objects in view, my invention consists in the construction, arrangement and combination of the various parts of my strap supported lubricator, whereby the objects contemplated are attained, as hereinafter more fully set forth, pointed out in my claims and illustrated in the accompany drawings, wherein:

Fig. 1 is a vertical sectional view through a strap supported lubricator embodying my present invention.

Fig. 2 is an enlarged vertical sectional view on the line 2—2 of Fig. 1 showing an indicator fitting.

Fig. 3 is an enlarged vertical sectional view on the line 3—3 of Fig. 1 showing a loader nozzle.

Fig. 4 is an enlarged vertical sectional view on the line 4—4 of Fig. 1 showing a pressure limiting valve; and Fig. 5 is a side elevation on a reduced scale showing the lubricator being suspended for determining the amount of its contents.

On the accompanying drawing I have used the reference numeral 10 to indicate a cylindrical lubricant container. The container 10 has a bottom wall 12, and a head 14 encloses the upper end of the cylinder. The head 14 is sealed to the container by a gasket 16 and is held in position by tying it to the bottom 12 in the following described manner:

An air pump cylinder 18 extends through the head 14 and terminates adjacent the bottom 12. A closure nut 20 is provided on the upper end of the air pump cylinder 18 and it seats against a gasket 22 interposed between 20 and the head 14. The lower end of the cylinder 18 is secured to a fitting 24 which in turn is secured to the bottom 12 by means of a cap screw 26, a gasket 28 being interposed for sealing purposes.

A follower F is provided for lubricant in the container 10 above the follower as will hereinafter appear. The follower F comprises a washer-like plate 30 with outer and inner annular sealing wipers 32 and 34 of neoprene or similar resilient material to wipe the inner wall of the container 10 and the outer wall of the cylinder 18 respectively. Cone shaped guides 36 and 38 are riveted to the washer 30 by means of rivets 40 and serve to properly align the follower F with the cylinders 10 and 18.

Within the cylinder 18 is an air piston 42 provided with a resilient U-cup 44 secured to a piston rod 46 by means of a cap screw 48. The piston rod 46 extends through the closure nut 20 and terminates in an operating handle 50. A bayonet pin 52 is provided to cooperate with a bayonet slot 54 to lock the air pump in its inner position, slightly lower than illustrated in Fig. 1, when the air pump operation is completed. This locking is accomplished against the action of a spring 55 which normally indicates the inner limit of movement during the pumping action of the pressurizing air pump 18—44.

The fitting 24 adjacent the bottom 12 of the lubricant container 10 is provided with a bore 56 through which the air from the pump flows and outlet ports 58 are provided which are normally closed by a resilient band 60 of neoprene or the like. The ports 58 and the band 60 act as an outlet valve for the air from the air pump to the space in the container 10 below the follower F.

The bottom 12 is provided with a vent valve 62 to be used during the loading operation as will hereinafter appear. This is simply a needle valve that may be manually opened or closed as desired.

The bottom 12 is also provided with a pressure limiting valve 64. This valve (see Fig. 4) has a stem 66 therein provided with a disc 68 which is seated against the top of the fitting 64 by a spring 74. Lock nuts 72 are provided to change the adjustment as desired. The spring 74 is enclosed in a closure nut 76. The pressure limiting valve 64 may be set at some suitable pressure such as 50 or 60 p. s. i.

The head 14 is provided with an indicator fitting 78. This fitting (see Fig. 2) has a head 80 on a stem 82 and the head is normally seated against a seat 84 by means of a spring 86. The tension of the spring is such that the head 80 will be unseated from the seat 84 under the action of lubricant pressure thereagainst at a pressure somewhat lower than the setting of the pressure limiting valve 64, for instance, 45 p. s. i.

The head 14 is also provided with a loader nozzle 88. This nozzle as shown in detail in Fig. 3 has a seat 92 against which a check ball 90 is normally seated by a spring 94. The operation of this nozzle will be described later.

A discharge hose 96 is provided having fittings 98 and 102 at its opposite ends. The fitting 98 is provided with an O-ring 100 for sealing purposes and the fitting 102 is adapted to connect with a discharge nozzle and control valve assembly shown in Fig. 5 by reference numerals 104 to 110. The reference numeral 104 indicates the body of the control valve assembly, the reference numeral 106 indicates a discharge pipe therefrom, the reference numeral 108 indicates a discharge nozzle for attachment to or engagement with a grease reception fitting and the reference numeral 110 indicates a control handle for opening the control valve 104.

The head 14 is provided with a perforated lug 112 to receive the discharge nozzle and control valve and control valve assembly as shown in Fig. 5 when not in use or when the lubricator is being operated to determine its contents as will hereinafter appear.

The head 14 is also provided with a lug 114 and the container 10 is provided with a lug 116 with which the ends of a strap 118 may be connected for supporting the lubricator over the shoulder of the operator.

*Practical operation*

In the operation of my lubricator the vent 62 is opened one or two turns to allow the follower F to move down freely without compressing air in the cylinder 10 below it. A discharge nozzle of a loader pump is associated with the loader nozzle 88 and the loader pump operated until the indicator fitting 78 begins releasing lubricant. This is an indication that the container 10 is full of lubricant.

The vent 62 is then closed, the lubricator is removed from the loader pump and placed on the floor or ground and the air pump is operated for compressing air in the cylinder 10 below the follower F. Again the indicator fitting 78 is used to determine when sufficient air has been pumped into the container. When lubricant starts coming out of the fitting 78 it is an indication that there is one p. s. i. of pressure on the lubricant to properly force it through the hose 96 to the control valve 104. Temperature, viscosity and the sheer quality of the lubricant being used will of course be factors in this indication. The operator then throws the strap 118 over his shoulder and proceeds to use the lubricator for lubricating the bearings of a tractor, automobile or the like.

The use of compressed air to force the follower F forwardly makes it possible to pump in additional pressure if the viscosity of the lubricant is high and I am thus able to maintain a substantially constant pressure on the lubricant. Also as the lubricant is used and the air volume below the follower F increases the pressure drops and additional air can be pumped in, whereas when a spring is used to urge the follower forwardly the spring pressure cannot be increased unless there is some way of adjusting its tension.

The operator may, at any time, determine the amount of lubricant remaining in the lubricator by placing the booster control valve 104 in the lug 112 as shown in Fig. 5 and suspending the lubricator by the handle 50. A spring 120 is provided surrounding the stem 46 for this purpose, the spring being enclosed in the cylinder 18 and engageable with the closure nut 20. The spring acts in the manner of a spring scale so that as the lubricant is discharged and the weight of the entire lubricator and its contents thus decreases the spring 120 will not be compressed as much and will therefore vary the extension of the stem 46 from the nut 20. The stem is provided with indicia such as "E," "H" and "F" indicating respectively, empty, half full and full.

My disclosed lubricator is comparatively light in weight and compact in size. The mounting of the pressurizing air pump within the lubricator makes possible the use of its cylinder to serve as a guide for the follower. This contributes to the compactness and also the use of the air pump permits of the use of relatively light weight mechanism to provide all the power necessary for forcing the follower forwardly even when the most viscous lubricant is used.

Some changes may be made in the construction and arrangement of the parts of my strap supported lubricator without departing from the real spirit and purpose of my invention, and it is my intention to cover by my claims any modified forms of structure or use of mechanical equivalents which may be reasonably included within their scope.

I claim as my invention:

1. In a lubricator, a lubricant container, a shoulder strap for supporting said lubricant container, an air pump for pressurizing the lubricant in said lubricant container, said air pump extending into one end of said lubricant container, a lubricant follower slidable on said air pump, said air pump discharging air on that side of said follower opposite said one end of said lubricant container, a lubricant discharge hose connected with said one end of said container to receive lubricant therefrom on the other side of said follower, and a discharge nozzle and control valve assembly connected with said discharge hose.

2. In a strap supported lubricator, a lubricant container, an air pump for pressurizing the lubricant in said lubricant container, said air pump extending into one end of said lubricant container, a lubricant follower slidable on said air pump, said air pump discharging air on that side of said follower opposite said one end of said lubricant container, an air vent connected with said lubricant container on said side of said follower, a lubricant discharge hose connected with said one end of said container to receive lubricant therefrom on the other side of said follower, a loading nozzle also connected with said one end of said container, a pressure operated indicator fitting connected with said lubricant container on said other side of said follower so as to discharge lubricant for indicator purposes when said container is pressure filled with lubricant entering said loading nozzle, and a discharge nozzle and control valve assembly connected with said discharge hose.

3. In a strap supported lubricator, a lubricant container, an air pump for pressurizing the lubricant in said lubricant container, said air pump extending into one end of said lubricant container, a lubricant follower slidable on said air pump, said air pump discharging air directly into said lubricant container on that side of said follower opposite said one end of said lubricant container, an air vent connected with said lubricant container on said side of said follower, a lubricant discharge hose connected with said one end of said container, and a discharge nozzle and control valve assembly connected with said discharge hose.

4. In a lubricator, a lubricant container, a shoulder strap for supporting said lubricant container, an air pump for pressurizing the lubricant in said lubricant container, said air pump extending into one end of said lubricant container, a lubricant follower slidable on said air pump, said air pump discharging air on that side of said follower opposite said one end of said lubricant container, a lubricant discharge hose connected with said one end of said container, a pressure operated indicator fitting connected with said one end of said lubricant container, and a discharge nozzle and control valve assembly connected with said discharge hose.

5. A lubricator comprising a cylindrical lubricant container having a bottom and a head, a strap for shoulder-supporting said lubricant container, said strap being connected with opposite ends thereof, an air pump cylinder extending through said head and terminating adjacent said bottom, a lubricant follower slidable on said air pump cylinder, an air pump piston slidable in said air pump cylinder and having a piston rod extending beyond said head and provided with an operating handle exterior thereof, an air discharge valve between said air pump cylinder and that portion of said lubricant container between said follower and said bottom, a lubricant discharge hose connected with said head, a pressure operated indicator fitting also connected therewith, and a discharge nozzle and control valve assembly connected with said discharge hose.

6. A lubricator comprising a cylindrical lubricant container having a bottom and a head, a strap for shoulder-supporting said lubricant container, said strap being connected with opposite ends thereof, an air pump cylinder extending through said head and terminating adjacent said bottom, a lubricant follower slidable on said air pump cylinder, an air pump piston slidable in said air pump cylinder and having a piston rod extending beyond said head and provided with an operating handle exterior thereof, an air discharge valve between said air pump cylinder and that portion of said lubricant container between said follower and said bottom, an air vent connected with said bottom, a lubricant discharge hose connected with said head, and a discharge nozzle and control volve assembly connected with said discharge hose.

7. In a strap supported lubricator, a lubricant container having a head and a bottom, an air pump for pressurizing the lubricant in said lubricant container, said air pump extending into said head of said lubricant container, a lubricant follower slidable on said air pump, said air pump discharging air in the bottom portion of said container on one side of said follower, a lubricant discharge hose connected with the head of said container on the other side of said follower, and a discharge nozzle connected with said discharge hose.

8. A lubricator comprising a cylindrical lubricant container having heads at opposite ends thereof, a strap for shoulder-supporting said lubricant container, said strap being connected with opposite ends thereof, an air pump cylinder extending through one of said heads and terminating adjacent the other, a lubricant follower slidable on said air pump cylinder, an air pump piston slidable in said air pump cylinder and having a piston rod extending beyond said one head and provided with an operating handle exterior thereof, a spring surrounding said piston rod and compressible by the weight of the lubricator when suspended by said operating handle, and indicia on said piston rod to indicate the weight of said lubricator and the contents of said lubricant container when so suspended.

9. A lubricator comprising a cylindrical lubricant container having heads at opposite ends thereof, an air pump cylinder extending through one of said heads, an air pump piston slidable in said air pump cylinder and having a piston rod extending beyond said one head and provided with an operating handle exterior thereof, a spring surrounding said piston rod and compressible by the weight of the lubricator when suspended by said operating handle, and indicia on said piston rod to indicate the weight of said lubricator and the contents of said lubricant container when so suspended.

References Cited in the file of this patent
UNITED STATES PATENTS

| | | |
|---|---|---|
| 872,314 | Wilson | Nov. 26, 1907 |
| 1,020,602 | Hamrick | Mar. 19, 1912 |
| 1,623,101 | Fisher | Apr. 5, 1927 |